United States Patent [19]

Carney et al.

[11] Patent Number: 4,739,799
[45] Date of Patent: Apr. 26, 1988

[54] PLUMBING TEST PLUG

[76] Inventors: Joseph H. Carney, 13495 Meyer Rd., Whittier, Calif. 90605; Rudy Lozano, 1537 Leanne Ter., Walnut, Calif. 91789

[21] Appl. No.: 920,679

[22] Filed: Oct. 20, 1986

[51] Int. Cl.$^4$ ............................................. F16K 17/36
[52] U.S. Cl. .................... 138/89; 138/96 R; 138/90; 137/67
[58] Field of Search ............... 138/89, 90, 96, 97; 137/67, 68.1; 285/3, 235; 220/89 A

[56] References Cited

U.S. PATENT DOCUMENTS

| | | | |
|---|---|---|---|
| 3,048,911 | 8/1962 | Almon | 138/89 X |
| 3,338,499 | 8/1967 | Gilbert | 138/89 X |
| 3,496,952 | 2/1970 | Amendola | 138/89 X |
| 4,114,653 | 9/1978 | Carlin | 138/89 X |
| 4,357,960 | 11/1982 | Han | 138/97 |
| 4,607,664 | 8/1986 | Carney et al. | 220/89 A X |

Primary Examiner—James E. Bryant, III
Attorney, Agent, or Firm—Jack C. Munro

[57] ABSTRACT

A plug to be temporarily located in a blocking manner within a pipe of a sewage pipe system of a building. The plug is to be installed within the pipe system as it is constructed. The plug is constructed to be frangible and totally dissolvable within water. A device is mounted on the sleeve directly in the area of the plug. When the plug is no longer needed, the device is operated from the exterior surface of the sleeve to effect breaking of the plug. The plug then passes through the pipe system and eventually dissolves.

4 Claims, 1 Drawing Sheet

U.S. Patent      Apr. 26, 1988      4,739,799
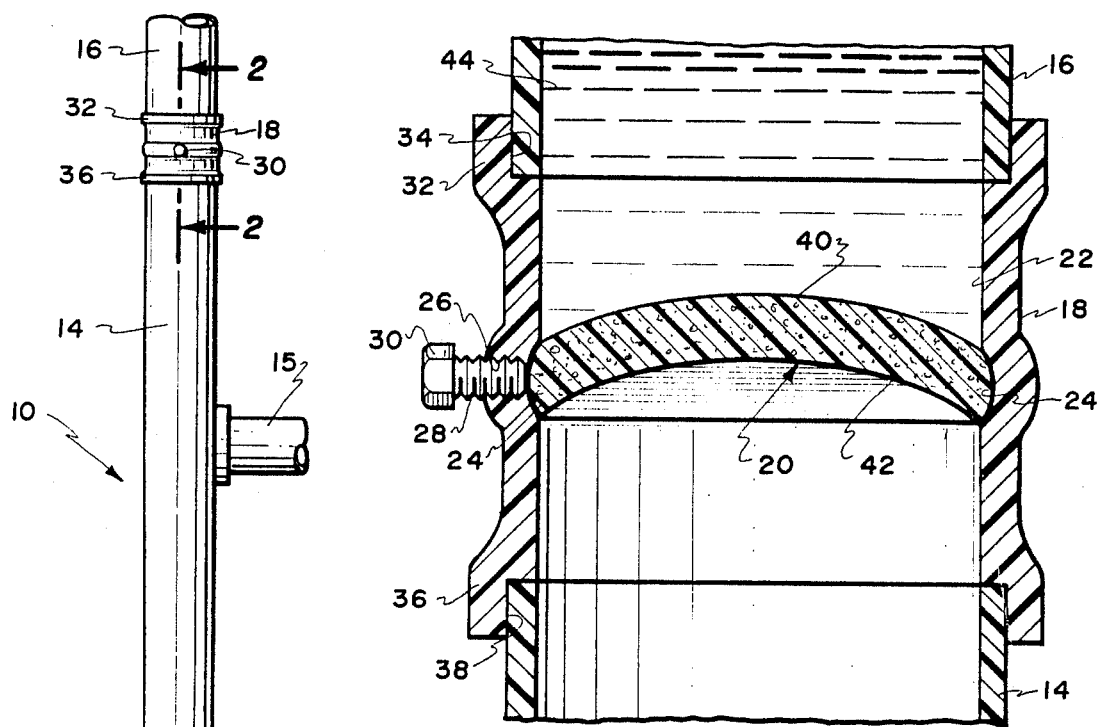
Fig. 2.
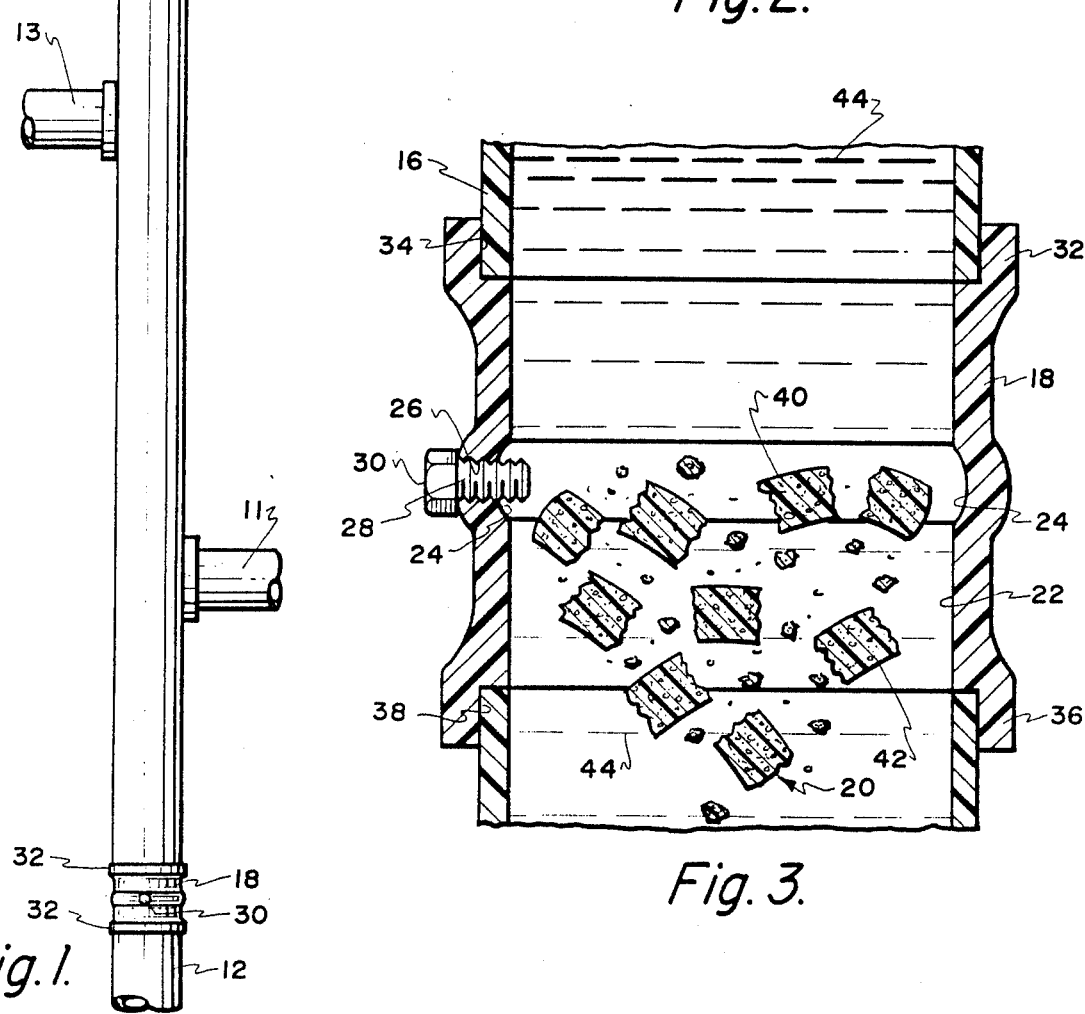
Fig. 1.
Fig. 3.

PLUMBING TEST PLUG

BACKGROUND OF THE INVENTION

The field of this invention relates to plumbing and more particularly to a device which is to be temporarily installed within a plumbing system of a building structure to permit testing to insure that all the piping connections within the plumbing system are connected in a fluid-tight manner.

In the constructing of any plumbing system within a building or home, it is required by most city and county codes that the plumbing system be tested to make sure that it is leak free. For example, if a multi-story office building is being built, every so many feet in height of the building, it is required to test the plumbing for any possible leaks. The common procedure is to install at an appropriate lower location with the plumbing a specially configured section of pipe which is defined as a "Y" section. The "Y" section has a short outwardly extending pipe which is normally closed. When it is required to test the pipe system, the plumber will open this short section of pipe and install an inflatable bladder within the pipe and inflate such to tightly close off the discharge outlet of the pipe system. The plumber then goes to the topmost pipe of the pipe system, that is open, and fills such with with water. The plumber then applies pressure to the required level, such as fifty pounds per square inch, and then observes if there are any leaks within any portion of the piping system. The inflatable bladder prevents escape of the water. If there are no leaks, the plumber then deflates the bladder and removes such which causes the water to escape and be discharged within appropriate sewer located exteriorly of the building.

Within a forty or fifty story building it is required that there be a substantial number of these "Y" sections installed. Each "Y" section is expensive and once it is used to effect testing of the system, the "Y" section is never used again. Also, this separate conduit from the "Y" section may provide for a collecting station for debris which can result in clogging of the plumbing system. It would be desirable to construct some form of a testing assembly which eliminated the use of such a "Y" with only a normal connection arrangement being employed between the different sections of pipe.

This invention is an improvement of U.S. Pat. No. 4,607,664 issued Aug. 26, 1986, entitled PLUMBING TEST PLUG APPARATUS.

SUMMARY OF THE INVENTION

The structure of the present invention is to be used within a pipe composed of a pair of in-line located sections of pipe. Between the sections of pipe there is incorporated a sleeve. Mounted within the interior portion of the sleeve is an annular groove. Within that annular groove is to be located a plug. This plug is constructed to be easily breakable by the applying of a peripheral force. The plug is constructed to eventually be completely dissolved within water. The applying of the peripheral force can be through the use of a clamping band which is mounted on the exterior surface of a flexible walled sleeve or by a bolt which is movable directly through the sleeve wall against the peripheral edge of the plug. The plug functions to prevent passage of water from one pipe section to another pipe section in order to permit the achieving of the desired test. Once the test has occurred, the plug is broken and the parts of the plug are then discharged through the sections of pipe to be eventually dissolved within a sewer system. The plug is to be constructed of paper, gypsum, starch and perlite.

The primary objective of the present invention is to construct a dissolvable plug to be used in a testing arrangement for a plumbing system which can achieve the testing at a substantially decreased cost than was heretobefore possible and can also be achieved in a substantially easier manner than was heretofore possible.

BRIEF DESCRIPTION OF THE DRAWING

FIG. 1 is an elevational view of a typical plumbing pipe system within which the subject matter of the present invention is to be utilized;

FIG. 2 is a longitudinal cross-sectional view taken along line 2—2 of FIG. 1 showing the plug in the unbroken configuration; and FIG. 3 is a cross-sectional view, similar to FIG. 2, but showing the plug in the broken configuration.

DETAILED DESCRIPTION OF THE SHOWN EMBODIMENT

Referring to the drawing, there is shown in FIG. 1 a discharge outlet pipe of a pipe system 10 that is to be incorporated within the plumbing of a conventional building. The system 10 is shown composed of a pipe 12, a pipe 14 and a pipe 16 which are generally located in a vertical position. Connecting pipes, such as pipes 11, 13 and 15, are shown connecting with pipe 14 and are to function to discharge their contents into pipe 14 which in turn is conducted into pipe 12 and hence to eventually be deposited exteriorly of the building within an appropriate sewer line. The pipe 16 is essentially identical to pipe 14 which is also essentially identical to pipe 12.

It is to be understood that human waste products and water are to be deposited within the pipes 11, 13 and 15 which are then disposed of within the pipe 14. There may be a substantially greater number of the connecting pipes (such as pipes 11, 13 and 15) connecting with pipe 14 or there may be a lesser number. It is important that the pipe 14 constitutes the only outlet line from the building for pipes 11, 13 and 15. It is to be understood that pipes, similar to 11, 13 and 15, will also be connected to pipe 16 and may or may not be connected to pipe 12 depending upon whether pipe 12 is located at the bottom floor of the building or at a higher elevation.

In order to connect together the pipes 12 and 14, and also connect together pipes 14 and 16, there is utilized a sleeve 18 which includes the plug 20 of the present invention. The sleeve 18 has an interior open-ended passage 22 which has an annular groove 24 formed in the wall of passage 22. A threaded hole 26 connects the groove 24. A bolt 28 is threadingly engaged with the hole 26. The bolt 28 has an enlarged head 30 which is to connect with a tool such as a wrench (not shown).

One end of sleeve 18 includes an enlarged flange 32 which produces annular recess 34 within the wall of the passage 22. The other end of the sleeve 18 includes a similar enlarged flange 36 which also forms a similar annular recess 38 within the wall of the passage 22. One of the pipe sections, such as pipe section 12, connects with the recess 38 with an end of the pipe section 14 connecting with the recess 34. Connections with the recesses 34 and 38 will be in a liquid-tight manner.

It is to be noted that the plug 20 defines a convex side 40 and a concave side 42. Convex side 40 will always be located in the upstream end of the passage 22. This is so that the water pressure to be applied against the convex side 40 will have a tendency to create a force tending to maintain the peripheral edges of the plug 20 in continuous tight contact with the groove 24.

It is important that the material of construction for the plug 20 is wholly dissolvable and be constructed of non-toxic material. Material of construction need not be immediately dissolvable, but can be dissolved over a period of time and actually it is important that the plug 20 be constructed of such a material. A preferable material of construction for the plug 20 will be as follows:

papier-maché, forty percent by weight
glue, thirty percent by weight
water, thirty percent by weight.

Papier-maché is a common available product which usually contains cellulose (paper fiber), starch (corn), gypsum, perlite and sodium benzocate. A desirable form for the glue would be a polyvinyl alcohol glue which is dissolvable within water.

The plug 20, when formed and dried, defines a solid plug. Normally the plug 20 will be manufactured directly within the passage 22 so that when it dries it will then be confined at its proper location within the groove 24. However, it is considered to be within the scope of this invention that the plug 20 could be manufactured exteriorly of the passage 22 then inserted within the groove 24.

In performing of the test procedure, the plumber fills the pipe system 10 to be tested above or upstream of the plug 20 with water 44. The open ends of the connecting pipes 11, 13 and 15 have been closed. The plumber then proceeds to exert pressure against the water 44 to at least fifty pounds per square inch. If no leaks become apparent, the plumber proceeds to tighten bolt 28 by engaging the enlarged head 30 with a wrench. As the bolt 28 is tightened, the inner end of the bolt presses against the peripheral edge of the plug 20. At a time when a sufficient amount of pressure has been applied, the plug 20 will break into several pieces which then will be conducted by the rush of water 44 through the pipe system 10 to be disposed of within the sewer system.

After the plug 20 has been broken, the sleeve 18 will then function merely as another section of the pipe such as pipe sections 12 and 14. As water continues to flow through the sleeve 18, any residue of the plug 20 will eventually be dissolved.

It has been found that in actual practice, the plug 20 will become quite soft within ten to fifteen minutes after usage. However, during the making of the test, which generally takes no more than five minutes, the plug 20 will remain sufficiently rigid to hold back the pressure of the water 44.

It is considered to be within the scope of this invention that another pressure applying arrangement could be utilized instead of the physical movement of the bolt 28. One example might be the including of an oil pressure fitting through the bolt 28. In this particular situation, the bolt 28 would be fixedly mounted onto the sleeve 18. Oil would be conducted through the fitting included within the bolt 28 which would be discharged about the peripheral edge of the plug 20. Upon sufficient amount of oil forced into the groove 24, the pressurized oil will in turn cause destruction of the plug 20.

What is claimed is:

1. In combination with a pipe system including a first pipe and a second pipe located in an in-line manner through which a fluid is to be conducted, both said first pipe and said second pipe having an open end, said open ends being located directly adjacent but spaced therefrom forming a gap, a sleeve mounted within said gap of both said first pipe and said second pipe being fixedly secured to said sleeve, a plug, said plug being mounted within said sleeve, said plug for temporarily blocking the discharged fluid flow path between said first pipe and said second pipe, said plug comprising:

said plug having a convex configuration when viewed from the upstream section of said pipe system, whereby as fluid pressure is applied to said convex configuration of surface the pressure has a tendency to tightly press the periphery of said plug into contact with the interior wall of said sleeve so as to insure the establishment of a fluid-tight connection between said plug and said sleeve; and said plug being constructed of a material which is completely dissolvable within water, said plug being destructable by being frangible, said plug being constructed of glue, water and papier-maché.

2. The combination as defined in claim 1 wherein:
said papier-maché including gypsum, starch, cellulose and perlite.

3. The combination as defined in claim 2 wherein:
said glue having a polyvinyl alcohol base.

4. The combination as defined in claim 1 wherein:
said sleeve having an interior wall surface, an annular groove formed within said interior wall surface, the periphery of said plug being located within said annular groove.

* * * * *